Figure 1:
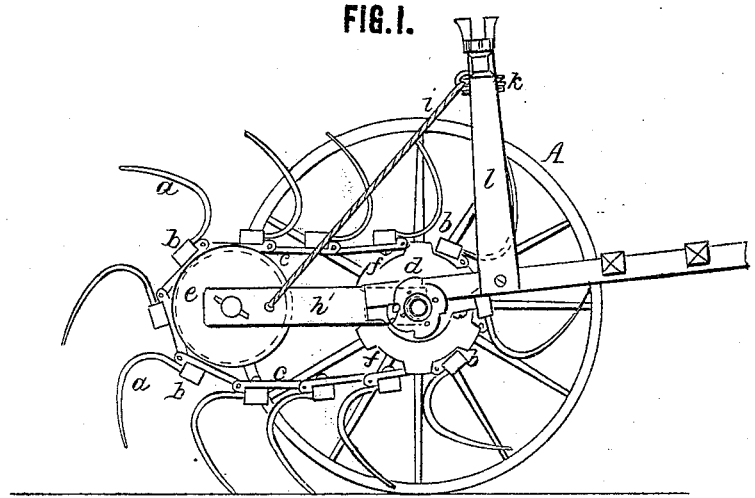

J. A. Talpey.
Tedder.

No. 96,741.  Patented Nov. 9, 1869.

Joseph A. Talpey
by A. Pollok
his atty.

WITNESSES.

United States Patent Office.

JOSEPH A. TALPEY, OF SOMERVILLE, MASSACHUSETTS.

Letters Patent No. 96,741, dated November 9, 1869.

HAY-TEDDER.

The Schedule referred to in these Letters Patent and making part of the same.

*To whom it may concern:*

Be it known that I, JOSEPH A. TALPEY, of Somerville, in the county of Middlesex, and State of Massachusetts, have invented certain new and useful Improvements in Hay-Tedders; and I hereby declare the following to be a full, clear, and exact description of the same, reference being had to the accompanying drawings.

My invention may be stated to comprise the following features:

First. A hay-tedder, in which a series of teeth or forks are arranged to move around one or more centres, substantially in the manner hereinafter described, whereby, when in operation, they shall move continuously in the same direction with, but at a slower rate than the wheels upon which the machine runs, so that each tooth, first, will gather or take up the hay, secondly, will then fall to the rear and be elevated, so as to turn and drop the hay, and, thirdly, will be carried over or around its axis or axes, and brought again in position to take up the hay.

Second. The combination, in a hay-tedder, of a series of teeth or forks, mounted upon an endless belt, which moves around two rollers or axes, the forward roller being mounted on or making part of the axle on which the wheels of the machine are mounted.

Third. The combination of the endless fork-belt with the two rollers around which it moves, when the rearmost roller is supported in a frame hinged or arranged in an equivalent manner, so as to be capable of an oscillating movement around the axis of the other roller, the object of this being to allow the teeth to be raised or lowered, as occasion demands.

Fourth. The combination of the endless fork-belt and the two rollers around which it moves, the one roller being capable of an oscillatory up-and-down motion upon the axis of the other, as above stated, with means for elevating or lowering said oscillatory roller, and thus determining the position of the teeth, and their distance from the ground.

Fifth. The combination of the tedder-teeth and the axle about which they revolve with the carriage-wheels and a ratchet and pawl, or their mechanical equivalent, mounted upon the wheels and axle respectively, under such an arrangement that when the machine is in motion, the teeth will remain at rest so long as they meet with no resistance, the ratchet riding over the pawl, but so soon as the teeth begin to take up hay, or meet with any resistance, they will be held to their work by the engagement of the ratchet and pawl, and allowed to fall to the rear slowly as the machine moves forward.

Other and minor features of the invention will be hereinafter described.

The nature of my improvements, and the manner in which the same are or may be carried into effect, will be readily understood by reference to the drawings hereunto annexed, in which—

Figure 1 is a top view, and

Figure 2:
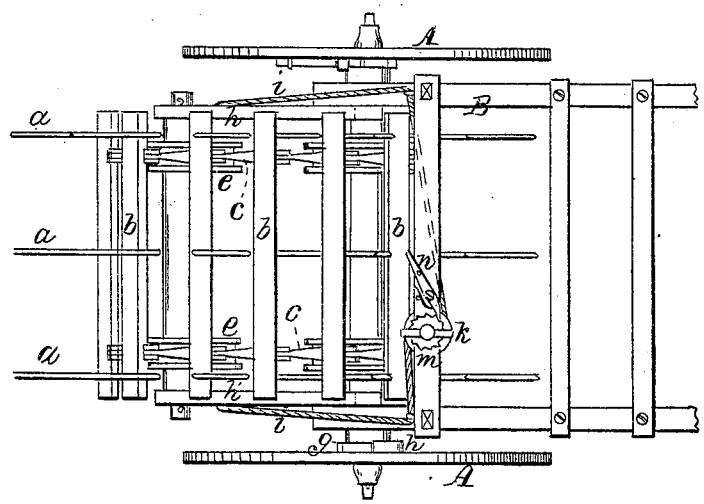

Figure 2, a side view of a machine made in accordance with my invention.

In the latter figure the rear wheel is removed, in order to allow the remaining parts to be more clearly distinguished.

The tedder-teeth or forks $a$, of any suitable form and construction, are, in this instance, fixed to cross-bars, $b$, which are attached to endless belts or chains, $c$, passing around two rollers or axes, $d$ $e$.

The forward roller $d$ is fixed to or forms part of the axle upon which the wheels A are mounted, and it has formed in it cogs or depressions, $f$, in which the cross-bars fall when the endless belt is in motion.

The teeth derive their movement around their axes, not from any positive impulse communicated by driving-mechanism, but by the resistance offered by their dragging over the ground when the machine moves forward. Supposing, therefore, the teeth to be in the position shown in the drawing, that is to say, in contact with the ground, and the machine to be in motion, the resistance offered to the teeth would have the effect to hold them back, and consequently to cause the revolution of the endless belt at the same rate of speed as that of the wheels. The teeth would therefore do no work, and there would be no taking up and turning of the hay, so that it becomes necessary that the movement of the teeth should be slower than that of the wheels, upon which the whole machine is moving forward.

To this end, I fix upon either or both ends of the axle, a ratchet, $g$, and upon the wheel or wheels A, a pawl, $h$; or the position of these parts may be reversed, if desired. In either event, however, the result will be to retard the movement of the teeth, the pawl or pawls acting as a restraining-agent. For when the machine moves forward, the first impulse of the endless tooth or fork-belt, supposing the teeth to meet with any resistance, will be to revolve as rapidly as the machine moves forward, but this impulse will be at once checked by one of the ratchet-teeth bringing up against the pawl, thus restraining the movement of the forward roller, and consequently of the endless belt, which, by means of its cross-bars, engages with the cogs or depressions formed in the roller. The roller will therefore make but one revolution while the wheels make one revolution, and the difference between the speeds of the endless belt and the machine when moving forward, will be equal to the difference between the circumference of the wheels and the forward roller.

The teeth are thus held to their work, and successively gather the hay, then, falling to the rear, and passing up over the rear roller, are elevated, so as to turn and drop the hay, and finally are carried across the top of the machine, and again brought down in position to recommence their work.

The movement of the teeth around their two centres is thus regulated by the difference between the size of the forward roller; that is to say, the roller which is to check the too rapid movement of the teeth, and that of the wheels.

It is manifest, that in place of the ratchet and pawl, other suitable devices for the purpose may be employed. I prefer, however, the use of the means, substantially such as specified, for the reason that when the teeth meet with no resistance, or when they are elevated, as will be presently described, above the ground, they will remain at rest, the pawl which follows the movement of the wheels riding over the ratchet, and not necessarily communicating any motion to the rollers or endless belt.

It is also manifest, that instead of causing the teeth to revolve around two centres, they may be made to revolve around but one. For instance, the endless belt can be dispensed with, and the teeth mounted upon a head occupying the place of the forward roller, and connected with the axle and the wheels in substantially the same way. I prefer, however, the arrangement of the teeth around two centres, as I am thereby enabled to make the rear part of the tedder capable of yielding in an up-and-down direction, so that the teeth can follow the inequalities of the ground, and so that the tedder-frame can be readily elevated to completely clear the ground.

To effect these results, I mount the rear roller in arms, or a frame, $h'$, hinged to the axle, or otherwise suitably secured in position, so as to be capable of an oscillatory up-and-down movement upon the axis of the forward roller, or thereabout. Thus the rear portion of the tedder-frame is made vibratory, and can rise or fall, to conform to the inequalities of the ground.

The teeth, it will be noticed, do not reach their lowest position until nearly under the rear roller, so that their position can be readily determined by elevating or lowering the rear end of the frame.

This is accomplished by means of cords or chains, $i$, at each side of the frame, which extend up and pass around a double pulley, $k$, mounted on a cross-beam, supported on uprights, $l$, a suitable distance above the teeth.

This pulley is turned by a thumb-piece, or other suitable device for the purpose, mounted on the axis of the pulley, and upon the same axis is also fixed a ratchet-wheel, $m$, to which is applied a spring-pawl, $n$, the object of these latter two pieces being to hold the vibratory tedder-frame at any desired height above the ground. By pressing on the tail-piece of the pawl, the ratchet can be released, and the frame lowered to any extent desired.

In lieu of the devices just described, other means, which will readily suggest themselves, can be employed for the same purpose.

The frame B, for the driver's seat, shafts, &c., is constructed and fixed or secured to the axle, in any ordinary or suitable manner.

It will be seen from the foregoing, that the wheels do not serve in any way to drive the teeth or the reels or rollers upon which the same are mounted, the latter deriving their movement from the resistance with which they meet, the wheels serving only to check and regulate that movement. There is thus a comparatively small expenditure of power required to perform the work, and the wheels can be made of little weight, and at little cost, compared with the wheels of those machines in which the teeth are driven by the wheels, while the whole mechanism is simplified, and the cogs and gearing ordinarily employed are dispensed with.

A machine, such as described, will also serve well as a harrow, all that is required being to substitute for the tedding-teeth, short stout teeth of suitable form, to act as harrow-teeth. In this case the teeth would leave the ground light, and in good condition, and would drop back upon it the grass, roots, weeds, &c.

Having now described my invention, and the manner in which the same is or may be carried into effect, What I claim, and desire to secure by Letters Patent, is—

1. A machine for tedding hay, and other purposes, as specified, in which a series of teeth or forks is arranged to revolve around one or more centres, substantially in the manner herein shown and described, so that, when in operation, they, although not actuated by the wheels upon which the machine runs, shall move continuously in the same direction with, but at a slower rate than said wheels, as and for the purposes set forth.

2. The combination, substantially as herein shown and described, in a hay-tedder, of a series of teeth or forks, mounted upon an endless belt, which moves around two rollers or axes, the forward roller being mounted on or making part of the axle on which the wheels of the machine are mounted.

3. The combination of the endless fork-belt with the two rollers around which it moves, when the rearmost roller is supported in a frame hinged or arranged in an equivalent manner, so as to be capable of an oscillatory movement around the axis of the other roller, substantially as and for the purposes specified.

4. The combination, substantially as described, of the endless fork-belt and the two rollers around which it moves, the one roller being capable of an oscillatory up-and-down motion upon the axis of the other, as specified, with means for elevating or lowering said oscillatory roller, and thus determining the position of the teeth, and their distance from the ground.

5. The combination of the tedder-teeth and the axis or axes about which they revolve with the carriage and a ratchet and pawl, or their mechanical equivalents, mounted upon the wheels and axle respectively, under the arrangement described, so that as soon as the teeth begin to take up hay, or meet with resistance, they will be held to their work by the engagement of the ratchet and pawl, and allowed to fall to the rear slowly, and to turn and drop the hay as the machine moves forward.

In testimony whereof, I have signed my name to this specification, before two subscribing witnesses.

JOSEPH A. TALPEY.

Witnesses:
FRANKLIN SMITH,
H. R. PATCH.